(12) United States Patent
Gless et al.

(10) Patent No.: US 9,490,471 B2
(45) Date of Patent: Nov. 8, 2016

(54) BATTERY COMPRISING A MOULDED BODY MADE OF A POROUS, MOISTURE-ABSORBING MATERIAL FOR TRANSPORTING MOISTURE OUT OF THE BATTERY HOUSING

(75) Inventors: Michael Gless, Stuttgart-Zazenhausen (DE); Ulrich Zimmermann, Hessigheim (DE)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 659 days.

(21) Appl. No.: 13/805,580

(22) PCT Filed: May 10, 2011

(86) PCT No.: PCT/EP2011/057522
§ 371 (c)(1),
(2), (4) Date: Apr. 15, 2013

(87) PCT Pub. No.: WO2011/160888
PCT Pub. Date: Dec. 29, 2011

(65) Prior Publication Data
US 2013/0209844 A1 Aug. 15, 2013

(30) Foreign Application Priority Data

Jun. 22, 2010 (DE) .................. 10 2010 030 367

(51) Int. Cl.
*H01M 2/00* (2006.01)
*H01M 2/36* (2006.01)
*H01M 2/10* (2006.01)
*H01M 2/12* (2006.01)
*H01M 10/42* (2006.01)

(52) U.S. Cl.
CPC ........... *H01M 2/362* (2013.01); *H01M 2/1077* (2013.01); *H01M 2/12* (2013.01); *H01M 2/1264* (2013.01); *H01M 2/1288* (2013.01); *H01M 10/42* (2013.01)

(58) Field of Classification Search
CPC .... H01M 2/36; H01M 2/362; H01M 2/1072; H01M 2/12; H01M 2/1264; H01M 2/0262; H01M 10/42; H01M 10/5075; H01M 10/5077; H01M 10/5079; B60K 1/04; B60S 5/06; Y02T 10/7005
See application file for complete search history.

(56) References Cited

U.S. PATENT DOCUMENTS 2,364,144 A 12/1944 Hunsaker

FOREIGN PATENT DOCUMENTS

| DE | 10 2007 011 026 A1 | 9/2008 | |
|---|---|---|---|
| DE | 10 2008 034 698 A1 | 6/2009 | |
| DE | 10 2009 032 463 A1 | 1/2011 | |
| JP | 62121618 A | 6/1987 | |
| JP | 2009-259785 A | 11/2009 | |
| JP | 2010-129392 * | 6/2010 | .............. H01M 2/10 |
| JP | 2010-129392 A | 6/2010 | |

OTHER PUBLICATIONS

International Search Report corresponding to PCT Application No. PCT/EP2011/057522, mailed Aug. 1, 2011 (German and English language document) (7 pages).

\* cited by examiner

*Primary Examiner* — Raymond Alejandro
(74) *Attorney, Agent, or Firm* — Maginot, Moore & Beck LLP

(57) ABSTRACT

A battery includes a housing in which at least one battery cell and a device configured to dry air present in a housing inner chamber are arranged. The battery also includes a molded body made of a porous, moisture-absorbing material that is arranged such that it extends both into the housing inner chamber and into an outer chamber of the housing and connects said chambers to each other such that moisture is conducted there between. The part of the molded body present in the housing inner chamber is connected to the device configured to dry the air present in the housing inner chamber such that collected water is transferred out of the device to the molded body for air drying.

12 Claims, 1 Drawing Sheet

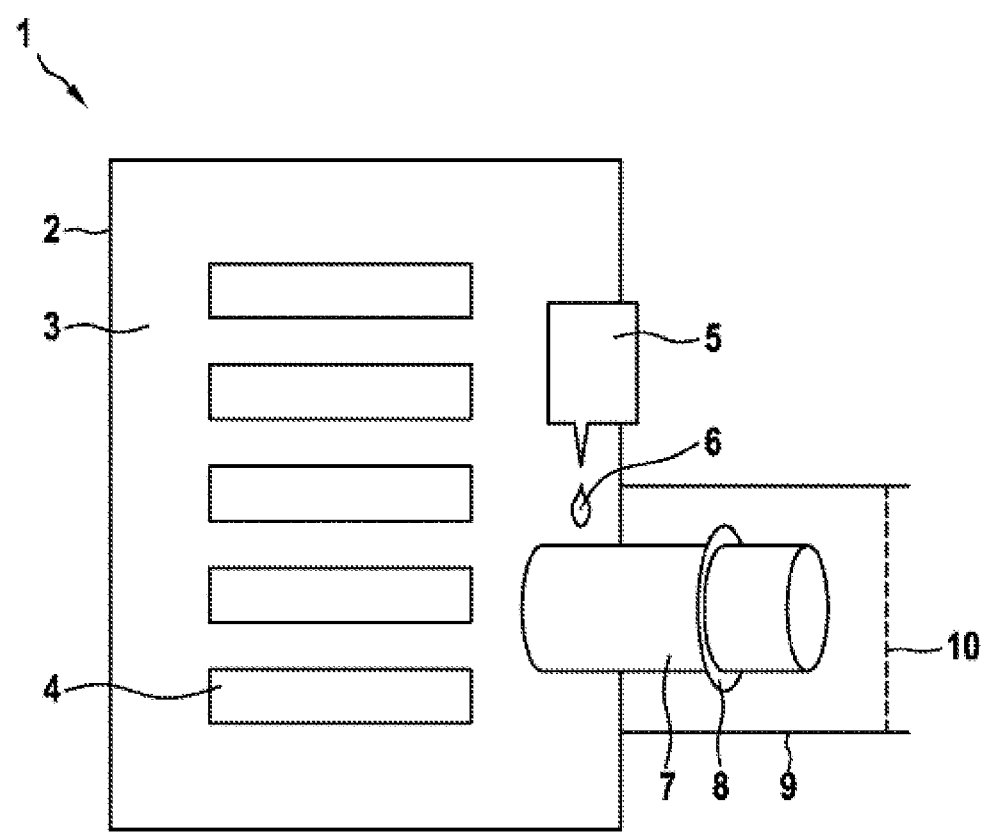

BATTERY COMPRISING A MOULDED BODY MADE OF A POROUS, MOISTURE-ABSORBING MATERIAL FOR TRANSPORTING MOISTURE OUT OF THE BATTERY HOUSING

This application is a 35 U.S.C. §371 National Stage Application of PCT/EP2011/057522, filed on May 10, 2011, which claims the benefit of priority to Serial No. DE 10 2010 030 367.4, filed on Jun. 22, 2010 in Germany, the disclosures of which are incorporated herein by reference in their entirety.

The present disclosure relates to a battery, in particular a lithium-ion battery comprising a molded body made from a porous, moisture-absorbing material for transporting moisture out of the battery housing and to a motor vehicle having such a battery.

BACKGROUND

In appliances which have a housing with an enclosed air volume which is exposed to temperature variations and therefore also to variations in volume, a pressure compensation element is usually provided. Such a pressure compensation element may be designed, for example, as a microporous diaphragm. Such a diaphragm is usually air-permeable.

One problem with such microporous diaphragms is that they are mostly impermeable to liquid water, but not to water vapor. In an atmosphere with high atmospheric moisture, therefore, moist air may pass through these microporous diaphragms into the housing interior. It may happen, inside the housing, that the moisture condenses out of the air to form liquid water. Such condensate may then cause the appliance to be damaged and may possibly even lead to its failure.

Attempts have already been made to capture such condensate by means of appropriate devices inside the housing and to collect it at suitable uncritical locations in the housing. In such solutions, however, the collected water remains inside the housing, so that, in course of time, very large quantities of condensate may accumulate. If the appliance is exposed to a temperature rise, the collected condensate may possibly partially evaporate again and increase the atmospheric moisture inside the housing. If the temperature then falls again, there is once again the risk that the water condenses at critical locations in the housing and causes damage.

DE 10 2007 011 026 A1 discloses a battery in which there is no microporous diaphragm provided as a pressure compensation element, but instead pressure compensation takes place via an orifice and a venting hose connected to it. In this battery, a cold trap for the collection of water is located inside the housing. The collected condensate is then discharged via an orifice and the venting hose out of the inside of the housing into the surroundings. One problem with this battery design is that the orifice and the venting hose have to be configured so as to be liquid-permeable so that the condensed water can be discharged out of the cold trap into the surroundings. On account of this, water may also enter the interior of the battery through this orifice and the venting hose, especially when the battery and therefore the cold trap are not actively in operation. Consequently, although this battery design has the possibility of transporting water out of the battery interior, this nevertheless entails an increased risk of absorbing water from the surroundings.

SUMMARY

According to the disclosure, a battery is made available, having a housing in which at least one battery cell and a device for the drying of air located in the housing inner space are arranged, characterized in that the battery has a molded body made from a porous, moisture-absorbing material, which molded body is mounted in such a way that it extends both into the housing inner space and into the space outside the housing and connects these to one another in a moisture-conducting manner, that part of the molded body which is located in the housing inner space being connected to the device for drying the air located in the housing inner space, in such a way that collected water can be transferred from the device for air drying to the molded body.

The present disclosure is based on the notion that a molded body made from a porous, moisture-absorbing material is present, integrated into the battery housing, in such a way that said molded body connects the inner space of the housing and the space outside the housing.

This molded body is capable of absorbing moisture from the interior of the battery housing and of distributing this moisture over its entire volume by means of capillary forces. That part of the molded body which lies outside the housing can then discharge this moisture to the ambient air again. The battery according to the disclosure has the advantage that moisture can be removed effectively from inside the housing, while at the same time pressure compensation via a microporous diaphragm remains possible.

The battery according to the disclosure comprises one or more battery cells which can suitably be connected to one another. The term "battery" is understood here to mean electrochemical energy accumulators, in particular energy accumulators of all customary accumulator technologies. Use may be made of batteries or accumulators of the type Pb—lead accumulator, NiCd—nickel-cadmium accumulator, NiH2—nickel-hydrogen accumulator, NiMH—nickel-metal hydride accumulator, Li-Ion—lithium-ion accumulator, LiPo—lithium-polymer accumulator, LiFe—lithium-metal accumulator, Li—Mn—lithium-manganese accumulator, LiFePO₄—lithium-iron-phosphate accumulator, LiTi—lithium-titanate accumulator, RAM—rechargeable alkaline manganese, Ni—Fe—nickel-iron accumulator, Na/NiC1—sodium-nickel chloride high-temperature battery, SCiB—supercharge ion battery, silver-zinc accumulator, silicon accumulator, vanadium redox accumulator and/or zinc-bromine accumulator. In particular, batteries of the lithium-ion, lead/acid, nickel-cadmium, nickel-metal hydride and/or sodium/sodium nickel chloride type batteries may be employed. Especially preferably, batteries of the lithium-ion battery type are used.

The battery according to the disclosure may in this case have both individual cells and modules composed of a plurality of cells and also more complex architectures comprising a plurality of cells and/or modules.

Preferably, the cells, modules, systems or accumulators are of the Li-Ion (lithium-ion) or LiPo (designated as lithium-polymer or lithium-ion-polymer) type. The following terms reflect examples of active materials which are employed in these lithium-ion cells: $Li_2Mn_2O_4$ (LMO) designated as lithium manganese spinel; $LiFePO_4$ (LFP)—lithium-iron-phosphate, $Li_4Ti_5O_{12}$ (LiTiO)—lithium-titanate.

The battery according to the disclosure has a housing in which at least one battery cell and a device for drying the air located inside the housing are arranged. In this case, the battery may have a single housing or a plurality of housings which in each case comprise one or more battery cells. The battery preferably has a common housing in which all the cells, systems or modules of the battery are arranged. The term "housing" is to be understood in this case to mean a device which has an inner space which is suitable for receiving one or more battery cells. Preferably, the housing completely delimits the contained battery cells with respect to the surroundings in all directions, so that an essentially closed-off space is obtained inside the housing. The housing may have closeable accesses, such as, for example, orifices closeable by means of covers. For the purpose of the present disclosure, a housing may be understood to mean not the direct cell jacket which separates the electrochemical constituents of an individual cell directly from the environment. The housing may preferably be manufactured from a material or have a material which comprises a metal, a sheet metal or a ceramic or is composed of this. The housing may especially preferably be manufactured from a material which has aluminum or is composed of this.

In the battery according to the disclosure, a device for drying the air located inside the housing is arranged in the housing. This device for drying serves for removing moisture from the air located inside the housing and for collecting said moisture at a location inside the housing. This ensures that moisture from the air located inside the housing does not condense on critical components or constituents of the battery and possibly cause detriment or damage there. Suitable devices for drying are described in the prior art and are known to a person skilled in the art. Devices are preferably used which dry the air located inside the housing by means of condensation drying. A suitable device for condensation drying is, for example, a cold trap. Such a cold trap is disclosed, for example, in DE 10 2007 011 026 A1.

The battery according to the disclosure is distinguished in that the battery has a molded body made from a porous, moisture-absorbing material, which molded body is mounted in such a way that it extends both into the inner space of the housing and into the space outside the housing and thereby connects the battery inner space to the space outside the battery in a moisture-conducting manner. In this case, that part of the molded body which is located in the inner space of the housing is connected to the device for drying the air located inside the housing, in such a way that collected water can be transferred from the device for air drying to the molded body and can be conducted via the molded body out of the housing interior further on to the space outside the battery. In this case, the molded body is preferably designed in such a way that water absorbed by the molded body is distributed essentially over the entire volume of the molded body. This distribution over essentially the entire volume of the molded body may be achieved, for example, in that the molded body distributes water absorbed at one end over the molded body by means of capillary forces. For this purpose, the molded body may preferably have a porous, moisture-absorbing material or be composed of said material which has capillary ascension for water. For the purpose of the present disclosure, a molded body is understood to mean a body which, in addition to width and height, has length (or depth), the result of which is that the molded body extends both into the inner space of the housing and into the space outside the housing of the battery according to the disclosure and is not only adjacent to these spaces. In this case, a diaphragm cannot be understood as being a molded body in the context of the present disclosure.

In order to allow the transport of water essentially by means of capillary effects over the entire length of the molded body from that end of the molded body which lies inside the housing to that end of the molded body which lies in the region outside the housing, the molded body may contain a porous, moisture-absorbing material or be composed of said material which has capillaries, the capillaries preferably having a predetermined mean radius. In particular, the battery according to the disclosure may have a molded body which has a porous, moisture-absorbing material or is composed of said material, the capillaries of which have a mean radius which allows the transport of water by means of capillary ascension from that end of the molded body which lies inside the housing to that end of the molded body which lies outside the housing.

The molded body is composed of a porous, moisture-absorbing material. Suitable porous, moisture-absorbing materials preferably comprise materials or material composites (composite materials) which comprise a fibrous substance, wood, chalk, paper, a polymer or a polymer mixture, glass and/or a sponge or are composed thereof.

In a preferred embodiment, the battery according to the disclosure has, at that end of the molded body which lies outside the housing, means which are suitable for promoting the transport of moisture via the molded body out of the inside of the housing into the outside space. For example, the molded body may have, on the side lying outside the housing, a device which is suitable for the extraction of moisture from the molded body. Since this device is mounted solely on that end of the molded body which is located outside the housing, the moisture contained at this end is preferentially removed from the molded body. This gives rise to a suction action over the volume of the molded body, the result of which is that moisture is transported from that end of the molded body which lies inside the housing in a directed manner to that end of the molded body which lies outside the housing. In a preferred embodiment, the device for the extraction of moisture may be designed as a heating element which is suitable for extracting moisture by means of a change in temperature from that part of the molded body which is located outside the housing.

The device for the extraction of moisture from the molded body may be configured so as to be activatable by the triggering of an operation for charging the battery or during said operation. This is especially advantageous since it thereby becomes possible to avoid the operation of this device taking place directly at the expense of the charging state of the battery according to the disclosure.

The molded body may essentially be a device for the passive transport of moisture, in particular water or condensation water, out of the inside of the housing of the battery according to the disclosure and for discharging said moisture into the environment. This transport basically takes place in the direction of a moisture gradient and can therefore take place, under the appropriate conditions, even in the opposite direction into the housing interior. Admittedly, this seems highly unlikely under normal conditions, since the molded body is in contact, at its end lying inside the housing, with the collected water of the device for drying the air located inside the housing, so that the water concentration at this end is usually always higher than the water concentration at that end of the molded body which is located outside the housing. Situations may be envisaged, however, in which that end of the molded body which is located outside the housing may come into contact with liquid water and there is the risk that a reversal of the concentration gradient could thereby be brought about. In order to counteract this risk, the battery according to the disclosure may have on the outside of the housing means which cause that part of the molded body which lies outside the housing to be protected from direct contact with liquid water, while an exchange of water vapor between the molded body and the ambient air is ensured. Such protection from direct contact with liquid water may take place, for example, by means of mechanical covering. That part of the molded body which lies outside the housing may, for example, be in contact with the ambient air via a microporous diaphragm. This microporous diaphragm is in this case distinguished in that it is essentially impermeable to liquid water, but is permeable to water vapor. Suitable microporous diaphragms may contain, for example, polytetrafluoroethylenes or be composed of these.

The present disclosure also relates to motor vehicles which comprise a battery according to the disclosure. In this case, the term "motor vehicle" is to be understood as meaning all driven vehicles which have an electrochemical energy accumulator, regardless of what drive these motor vehicles have. In particular, the term "motor vehicle" embraces electric hybrid vehicles (HEV), plug-in hybrid vehicles (PHEV), electric vehicles (EV), fuel cell vehicles and all vehicles which use an electrochemical energy accumulator for electrical energy supply and/or for the at least partial supply of a drive train.

BRIEF DESCRIPTION OF THE DRAWING

Exemplary embodiments of the disclosure are explained in more detail by means of the following drawing and the accompanying description. In the drawing:

The FIGURE shows a diagrammatic illustration of a first embodiment of the battery according to the disclosure.

DETAILED DESCRIPTION

The FIGURE shows a diagrammatic illustration of an embodiment of a battery according to the disclosure. The battery 1 according to the disclosure comprises a housing 2 which surrounds a housing inner space 3 in such a way that an essentially closed-off air space is obtained in the housing inner space 3. Arranged in the housing inner space 3 are one or more battery cells 4 and a device 5 for the drying of air located in the housing inner space 3. The device 5 may in this case be designed, in particular, as a cold trap. Furthermore, the battery 1 has a molded body 7 which is formed from a porous, moisture-absorbing material. The molded body 7 is arranged in such a way that the molded body 7 extends both into the housing inner space 3 and into the space outside the housing 2. The molded body 7 thus connects the atmosphere of the housing inner space 3 to the atmosphere of the space outside the housing 2 in such a way as to allow the transport of liquid between the two atmospheres via the molded body 7. The molded body 7 is positioned in the housing 2 and connected to the device 5 in such a way that a transfer of collected water 6 from the device 5 to that part of the molded body 7 which is located in the housing inner space 3 is possible. In order to allow as effective a transport as possible of collected water 6 out of the housing inner space 3 via the molded body 7 into the space outside the housing 2, a heating element 8 is provided on that part of the molded body 7 which lies outside the housing 2. The heating element 8 serves in this case as a device for the extraction of moisture from the molded body 7. In order to avoid direct contact of that part of the molded body 7 which lies outside the housing 2 with liquid water, the battery according to the disclosure has a mechanical covering 9, into which a microporous diaphragm 10 is embedded. The microporous diaphragm 10 and the mechanical covering 9 are in this case designed in such a way that they are impermeable to liquid water. Furthermore, the microporous diaphragm 10 is distinguished in that, although it is impermeable to liquid water, it is nevertheless permeable to water vapor, so that water discharged from that part of the molded body 7 which lies outside the housing 2 can be discharged into the surroundings of the battery 1 through the microporous diaphragm 10.

The invention claimed is:

1. A battery comprising:
   a housing defining a housing inner space;
   at least one battery cell arranged in the housing;
   a drying device arranged in the housing and configured to dry air located in the housing inner space; and
   a molded body separate from the drying device and made entirely from a porous, moisture-absorbing material, the molded body mounted such that the porous, moisture-absorbing material extends both into the housing inner space and into a space outside the housing, connecting the housing inner space to the space outside the housing in a moisture-conducting manner, a first portion of the molded body is located entirely in the housing inner space and a second portion of the molded body is located entirely outside the housing,
   wherein the first portion of the molded body is connected to the drying device so as to receive water collected by the drying device, and
   wherein the molded body is in direct contact with both the housing inner space and the space outside the housing.

2. The battery as claimed in claim 1, wherein the porous, moisture-absorbing material is configured such that absorbed water is distributed over an entire volume of the molded body.

3. The battery as claimed in claim 1, wherein the porous, moisture-absorbing material has capillary ascension for water.

4. The battery as claimed in claim 1, wherein the porous, moisture-absorbing material has capillaries with a predetermined mean radius selected such that water is transported in the porous, moisture-absorbing material by capillary ascension from the first portion of the molded body, to the second portion of the molded body.

5. The battery as claimed in claim 1, wherein the porous, moisture-absorbing material comprises or is composed of at least one of a fibrous substance, wood, chalk, paper, a polymer, glass and a sponge.

6. The battery as claimed in claim 1, wherein the drying device is configured to condense moisture from the air located in the housing inner space.

7. The battery as claimed in claim 1, further comprising an extracting device positioned on the second portion of the molded body and configured to extract moisture from the molded body.

8. The battery as claimed in claim 7, wherein the extracting device is a heater.

9. The battery as claimed in claim 8, wherein the battery is configured such that the heater is activated by one of (i) triggering an operation to charge the battery and (ii) during said operation to charge the battery.

10. The battery as claimed in claim 1, further comprising a mechanical covering protecting the second portion of the molded body from direct contact with external liquid water.

11. The battery as claimed in claim 10, wherein the mechanical covering includes a microporous diaphragm configured to enable exchange of water vapor between the second portion of the molded body and ambient air and to disable transfer of liquid water to the second portion of the molded body.

12. A motor vehicle comprising:
  a battery including:
    a housing defining a housing inner space;
    at least one battery cell arranged in the housing;
    a drying device arranged in the housing and configured to dry air located in the housing inner space; and
    a molded body separate from the drying device and made entirely from a porous, moisture-absorbing material, the molded body mounted such that the porous, moisture-absorbing material extends both into the housing inner space and into a space outside the housing, connecting the housing inner space to the space outside the housing in a moisture-conducting manner, a first portion of the molded body is located entirely in the housing inner space and a second portion of the molded body is located entirely outside the housing,
  wherein the first portion of the molded body is connected to the drying device so as to receive water collected by the drying device, and
  wherein the molded body is in direct contact with both the housing inner space and the space outside the housing.

* * * * *